(12) United States Patent
Chen

(10) Patent No.: US 7,866,998 B2
(45) Date of Patent: Jan. 11, 2011

(54) ELECTRICAL CARD CONNECTOR

(75) Inventor: Zhi-Jian Chen, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/569,904

(22) Filed: Sep. 30, 2009

(65) Prior Publication Data
US 2010/0081331 A1 Apr. 1, 2010

(30) Foreign Application Priority Data
Sep. 30, 2008 (CN) ........................ 2008 1 0155422

(51) Int. Cl.
H01R 13/62 (2006.01)
(52) U.S. Cl. ...................................... 439/159
(58) Field of Classification Search ................. 439/159, 439/152–158, 160
See application file for complete search history.

(56) References Cited

U.S. PATENT DOCUMENTS 6,761,569 B2 * 7/2004 Nakamura ................... 439/159
7,367,828 B2 * 5/2008 Matsukawa et al. ......... 439/160
7,448,890 B2 * 11/2008 Ting ............................ 439/159
2005/0282440 A1 * 12/2005 Tseng et al. ................. 439/630
2009/0221168 A1 * 9/2009 Yu et al. ...................... 439/159

* cited by examiner

Primary Examiner—Gary F. Paumen
(74) Attorney, Agent, or Firm—Ming Chieh Chang; Wei Te Chung; Andrew C. Cheng

(57) ABSTRACT

The electrical card connector (100) has a card receiving space for receiving an electrical card includes an insulative housing (10), a plurality of terminals (20) received in the insulative housing, a metallic shell (30) covered on the insulative housing, and an ejector (50) attached to a lateral side of insulative housing. The insulative housing is disposed on front section of the metallic shell. The ejector includes a base seat (51), a slider (53), a spring (52) and a cam follower (54). The slider is able to slide along a card inserting/ejecting direction. A metallic sheet (514) is assembled to the base seat. The base seat and the metallic sheet form a slot (515), the metallic sheet acts as a bottom wall and one lateral side wall of the slot.

14 Claims, 3 Drawing Sheets

ELECTRICAL CARD CONNECTOR

BACKGROUND OF THE INVENTION

1. Field of the Invention

The present invention relates to an electrical card connector, and in particular to an electrical card connector having an ejector.

2. Description of Prior Arts

Normally, the electrical card connector includes an insulative housing, a plurality of terminals received in the housing, a metallic shell covered on the housing and an ejector. The ejector is assembled to a lateral side of the insulative housing, and includes a base, a spring, a cam follower and a metallic slider. The metallic slider comprises a sliding portion and an ejecting portion. The ejecting portion engages with an electrical card inserted into the electrical connector. The sliding portion of the slider is able to slide in a slot, which is defined on the base. Traditionally, the base is made of resin. The sliding friction between the sliding portion and the slot is large. The resin slot of the base will be damaged by the metallic sliding portion and the ejector is not able to work normally, when the sliding portion is sliding in the slot. The electrical card inserted into the electrical card connector can not be ejected by the ejector smoothly.

Therefore, it is desirable to provide an electrical card connector with a new ejector that eliminates the aforesaid problems.

SUMMARY OF THE INVENTION

Accordingly, an object of the present invention is to provide an electrical card connector with an ejector which is able to work normally for a long time.

In order to achieve afore-mentioned object, the electrical card connector has a card receiving space for receiving an electrical card includes an insulative housing, a plurality of terminals received in the insulative housing, a metallic shell covered on the insulative housing, and an ejector attached to a lateral side of insulative housing. The insulative housing is disposed on front section of the metallic shell. The ejector includes a base seat, a slider, a spring and a cam follower. The slider is able to slide along a card inserting/ejecting direction. Wherein, a metallic sheet is assembled to the base seat. The base seat and the metallic sheet form a slot, the metallic sheet acts as a bottom wall and one lateral side wall of the slot. The slider slides in the slot.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
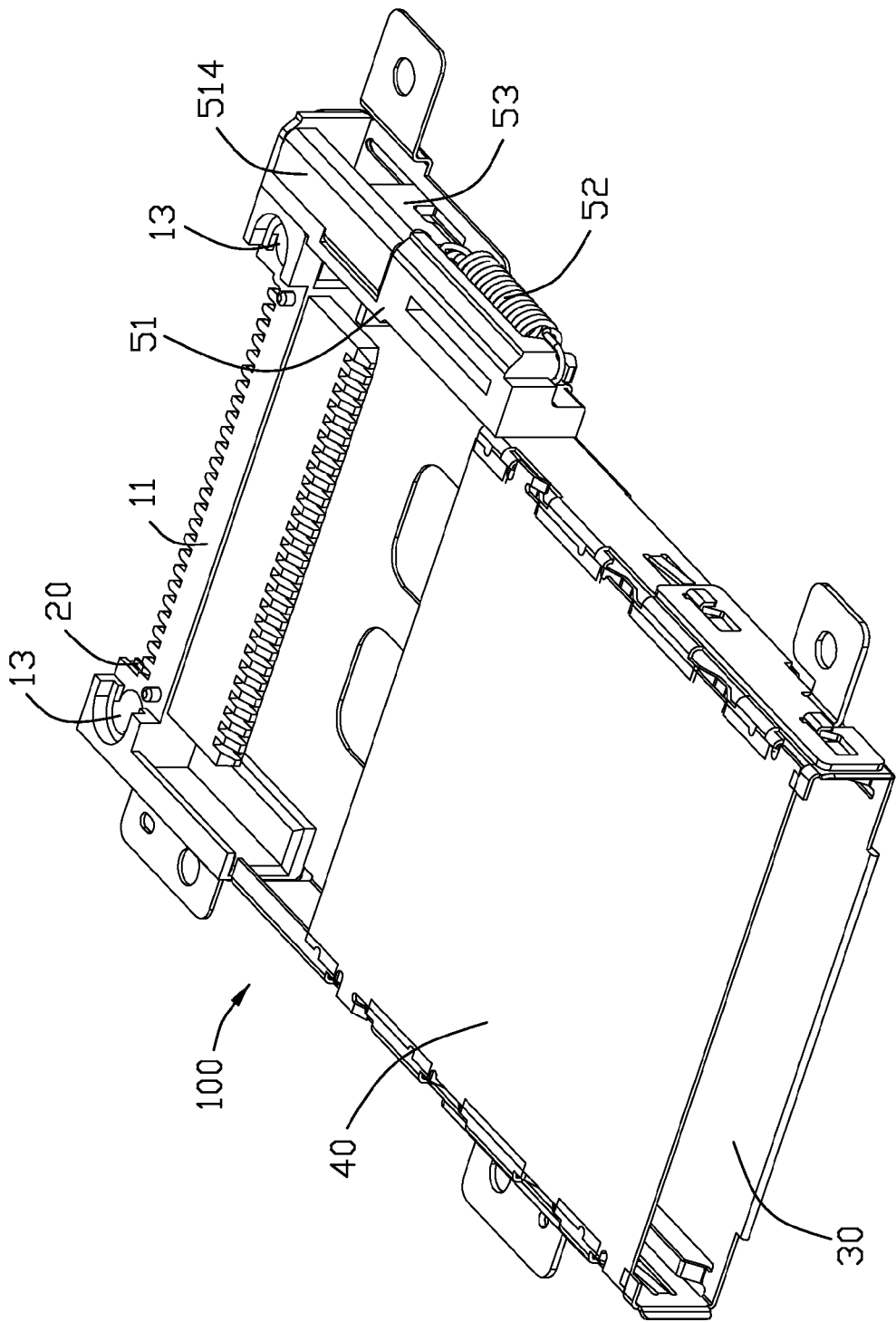
FIG. 1 is a perspective view of an electrical card connector in accordance to the present invention.
Figure 2:
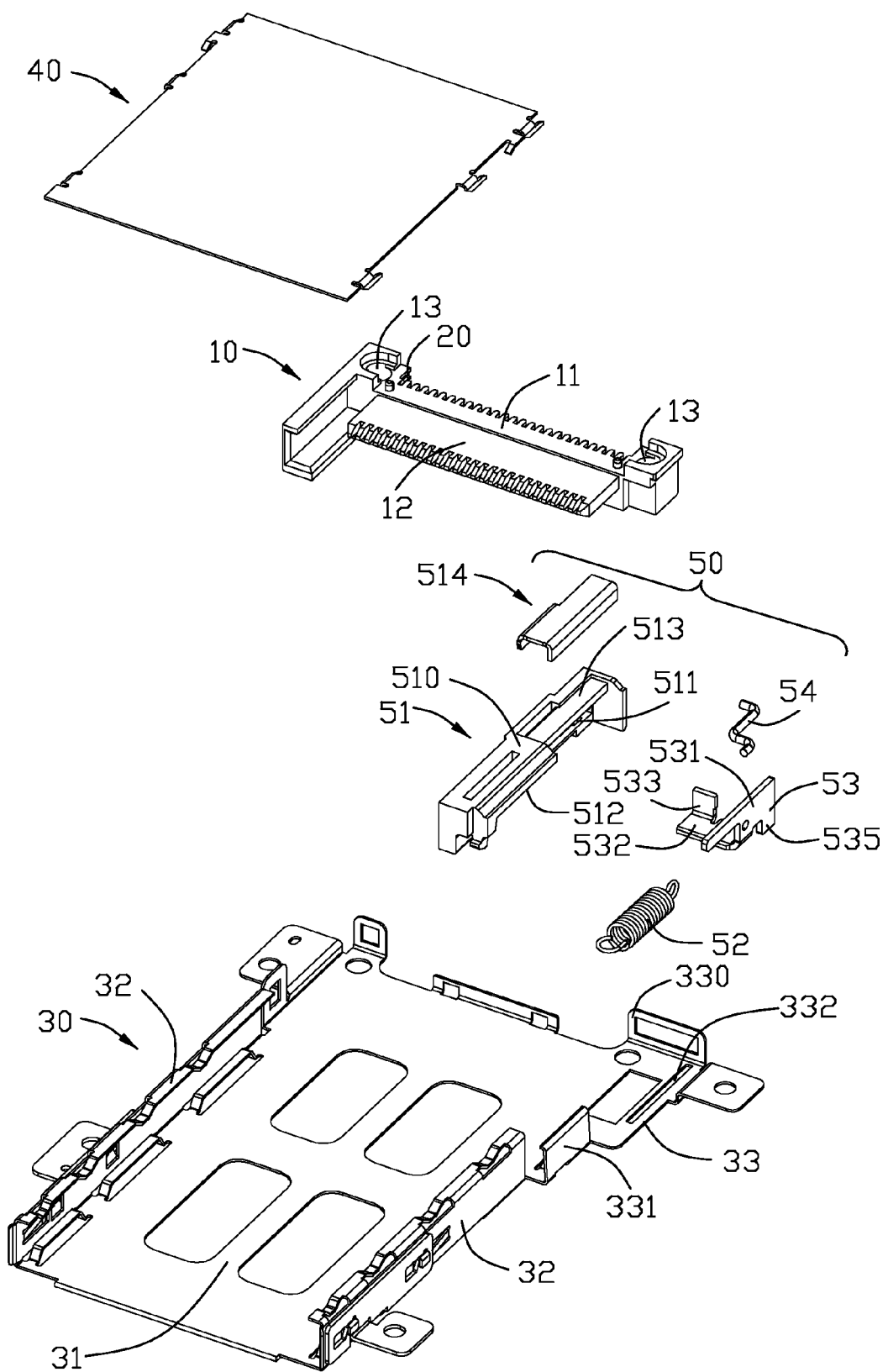
FIG. 2 is an exploded view of the electrical card connector of FIG. 1.
Figure 3:
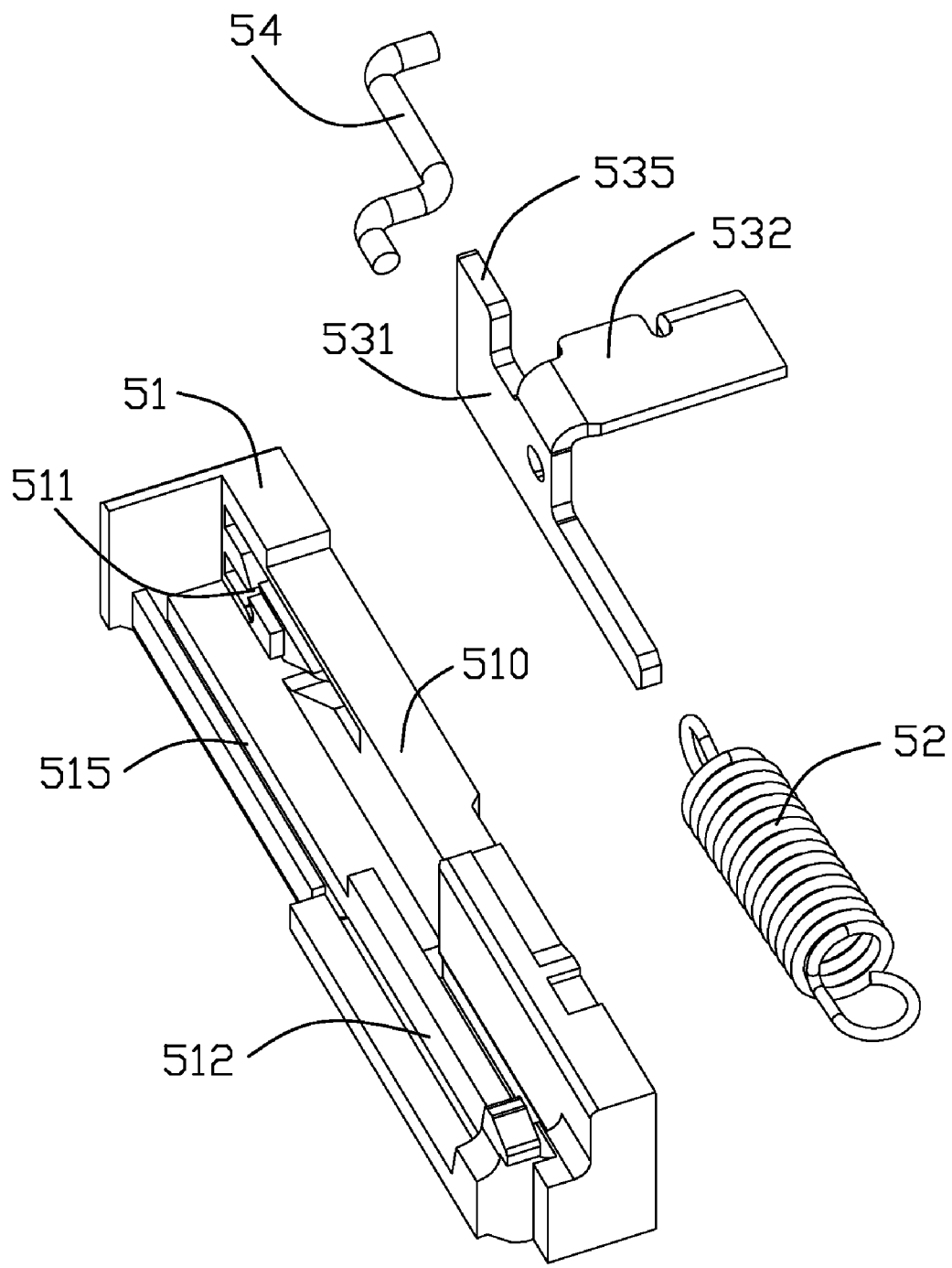
FIG. 3 an exploded view of the ejector shown in FIG. 1.

Referring to FIGS. 1 to 2, the present invention relates to an electrical card connector 100. The electrical card connector 100 includes a insulative housing 10, a plurality of terminals 20 received in the insulative housing 10, a metallic shell 30 covered on the insulative housing 10, a back board 40 assembled to the shell 30 and an ejector 50.

Referring to FIG. 2, the insulative housing 10 is disposed on a front section of the metallic shell 30. The insulative housing 10 has a base portion 11, a tongue board 12 mating with an electrical card and a pair of fixing portions 13 attached to opposite sides of the base portion 11. The terminals 20 are received in the tongue board 12 and the base portion 11.

The metallic shell 30 covers on the insulative housing 10 to form a receiving space (not labeled) for receiving the electrical card. The metallic shell 30 has a main portion 31, and a plurality of lateral side walls 32 extending from the main portion along a vertical direction. The main portion 31 defines an assembling section 33. The assembling section 33 is disposed on the front section of the main portion 31 adjacent to a lateral side. The ejector 50 is assembled on the assembling section 33. The assembling section 33 defines a first fixing pin 330 and a second fixing pin 331, both of which extend along the vertical direction perpendicular to the main portion 31. A slot 332 is defined on the main portion 33 between the first fixing pin 330 and the second fixing pin 331.

The back board 40 is assembled to the lateral side walls 32 of the metallic shell 30. Therefore, the back board 40 acts as a back wall of the electrical card connector 100.

The ejector 50 is attached to a lateral side of the insulative housing 10. The ejector 50 includes a base seat 51, a spring 52, a slider and a cam follow 54. The base seat 51 has a step portion 510, and the step portion extends along the electrical card inserted/ejected direction. A cam groove 511 is defined on the step portion 510. The base seat 51 further defines a first slot 512 parallel and adjacent to the step portion 510. The base seat 51 has a cutout 513 for receiving a U-type metallic sheet 514. The U-type metallic sheet 514 and the base seat 51 form a second slot 515. The first slot 512 borders on the second slot 515 in the electrical card inserting/ejecting direction to form a complete slot. The second slot 515 has a metallic bottom surface (not labeled) and a metallic outside wall (not labeled). The second slot 515 is ahead of the first slot 512.

The slider 53 is formed from metallic sheet and able to side on the first slot 512 and the second slot 515 along the electrical card inserting/ejecting direction. The slider 53 includes a sliding portion 531, an ejecting portion 533 and a connecting portion 532. The sliding portion 531 is slidablely received in the first slot 512 and the second slot 515 and defines a guiding pin 535. The guiding pin 535 is slidablely received in the slot 332. The ejecting portion 533 extends into the card receiving space. One distal end (not labeled) of the cam follower 54 is slidablely received in the cam groove 511, and the other end of the cam follower 54 is rotatablely received in the hole (not labeled) defined on the sliding portion 531. The spring 52 biases the slider 53.

When the electrical card (not shown) is inserted into the electrical card connector 100, the ejecting portion 533 engages with the electrical card, and the electrical card drives the ejecting portion 533 to go ahead. When the ejecting portion 533 is being driven, the ejecting portion 533 is suffered a twist force because of the spring 52. And the twist force make the slider 53 deform. Therefore, when the sliding portion 531 of the slider 53 is sliding on the first slot 512 and the second slot 515, the bottom surface and the inner surface of the outside wall engage with the sliding portion 531 and produce a friction. The friction would became more big, as the electrical card is inserted more deep. The spring 52 would produce power, as it is pulled. The friction damages the slot of the base seat 51 and influences the ejector work well. So that, the inventor uses the U-type metallic sheet 514 to instead of the second slot 515. The coefficient of sliding friction between the second slot 515 and the sliding portion will reduce, because the sliding portion 531 and the second slot 515 are both made from metallic material. Therefore, the friction between the second slot 515 and the sliding portion 531 is reduced. And the second slot 515 would not be damaged easily, because of the U-type metallic 514.

When the sliding portion 531 is sliding on the first slot 512, the friction between first slot 512 and the sliding portion 531 is small. The influence of the friction is reduce. Because the spring is not pulled so long to produce big power. And the first slot 512 is integrally formed with the base seat 51, the first slot 512 is enough firmly to bear the sliding portion 531.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical card connector, comprising:
an insulative housing;
a plurality of terminals received in the insulative housing;
a metallic shell covering on the insulative housing, the insulative housing disposed at a front section of the metallic shell; and
an ejector attached to a lateral side of the insulative housing, the ejector comprising a base seat, a slider, a spring and a cam follower, the slider being able to slide along a card inserting/ejecting direction; wherein the ejector includes
a metallic sheet connected to the base seat, and the base seat and the metallic sheet form a slot, the metallic member acts as a bottom wall and one lateral side wall of the slot, and the slot slidably receives the slider.

2. The electrical card connector as claimed in claim 1, wherein the base seat has a cutout, said metallic sheet is received in the cutout, and the metallic sheet is U-shaped.

3. The electrical card connector as claimed in claim 2, wherein the slider comprises a sliding portion slidable in the slot, an ejecting portion extending into the card receiving space and a connecting portion.

4. The electrical card connector as claimed in claim 3, wherein the sliding portion defines a guiding pin, the metallic shell has a groove to cooperate with the guiding pin, and the guiding pin is able to slide in the groove along the card inserting/ejecting direction.

5. The electrical card connector as claimed in claim 1, wherein the base seat defines a cam groove, one distal end of the cam follower is slidably received in the cam groove, and the other end of the cam is rotatably assembled to the slider.

6. The electrical card connector as claimed in claim 5, wherein opposite ends of the spring are attached to the cam follower and the base seat, respectively, and the spring biases the slider.

7. The electrical card connector as claimed in claim 6, wherein the metallic shell defines a first fixing pin and a second fixing pin, and the first fixing pin and the second fixing pin fixes the base seat.

8. The electrical card connector as claimed in claim 7, wherein the first fixing pin is perpendicular to the second fixing pin.

9. The electrical card connector as claimed in claim 1, wherein a back board is assembled to the metallic shell to act as a back wall of the connector.

10. An electrical card connector comprising:
an insulative housing defining a mating port;
a plurality of contacts disposed in the housing and exposed on the mating port;
a metallic shell covering the housing and cooperating with the housing to define a card receiving space;
an ejector including:
an insulative stationary base seat with a cam groove thereof;
a metallic slider moveable relative to the base in a front-to-back direction;
a cam follower linked between the base seat and the slider so as to decide inner and outer positions of said slider regard to the base seat; and
a spring constantly urging the slider forwardly; wherein
said slider defines a vertical plate with upper and lower edges respectively received in corresponding upper and lower slots both of which are formed by metallic members, respectively, for assuring reliable engagement therebetween without damage.

11. The electrical card connector as claimed in claim 10, wherein one of said upper and lower slots is formed by said metallic shell while the other is formed by a metallic sheet secure to the base seat.

12. The electrical card connector as claimed in claim 11, wherein said other of the upper and lower slots is essentially formed by cooperation of said metallic sheet and a side wall of said base seat.

13. The electrical card connector as claimed in claim 11, wherein said metallic shell is of a U-shaped configuration.

14. The electrical card connector as claimed in claim 11, wherein the base seat independently defines another slot in alignment with the other of said upper and lower slots so as to receive a corresponding one of the upper and lower edges of the slider therein.

* * * * *